United States Patent [19]

Cataldo

[11] Patent Number: 4,581,002

[45] Date of Patent: Apr. 8, 1986

[54] V-BELT STRUCTURE

[75] Inventor: Roy S. Cataldo, Birmingham, Mich.

[73] Assignee: General Motors Corporation, Detroit, Mich.

[21] Appl. No.: 732,583

[22] Filed: May 10, 1985

Related U.S. Application Data

[63] Continuation-in-part of Ser. No. 614,749, May 29, 1984, abandoned.

[51] Int. Cl.$^4$ ............................................. F16G 5/00
[52] U.S. Cl. ................................... 474/242; 474/201
[58] Field of Search ................ 474/242, 246, 240, 201

[56] References Cited

U.S. PATENT DOCUMENTS

| | | | |
|---|---|---|---|
| 3,949,621 | 4/1976 | Beusink et al. | 474/201 |
| 4,386,921 | 6/1983 | Roberts | 474/242 X |
| 4,457,742 | 7/1984 | Hattori et al. | 474/242 X |

Primary Examiner—Stephen J. Novosad
Assistant Examiner—Thuy M. Bui
Attorney, Agent, or Firm—Donald F. Scherer

[57] ABSTRACT

A push-type metal V-belt for use with V-grooved pulleys is produced with a single formed and fan-folded strip of sheet metal. The folded strip has alternately tight-folded and open-folded portions having less height when viewed edgewise of the open-folded portions. During the forming of the strip, adjacent drive edges are formed so that when folded, these edges are aligned so as to become drive surfaces of the belt. When viewed in a lateral section, the drive surfaces are the outer edges of a substantially trapezoidal surface. Also, during the forming of the strip, a plurality of lateral slots are formed to provide an area or space for housing a plurality of metal bands which maintain the fan-folded strip in a continuous belt or loop configuration.

4 Claims, 5 Drawing Figures

U.S. Patent  Apr. 8, 1986  4,581,002
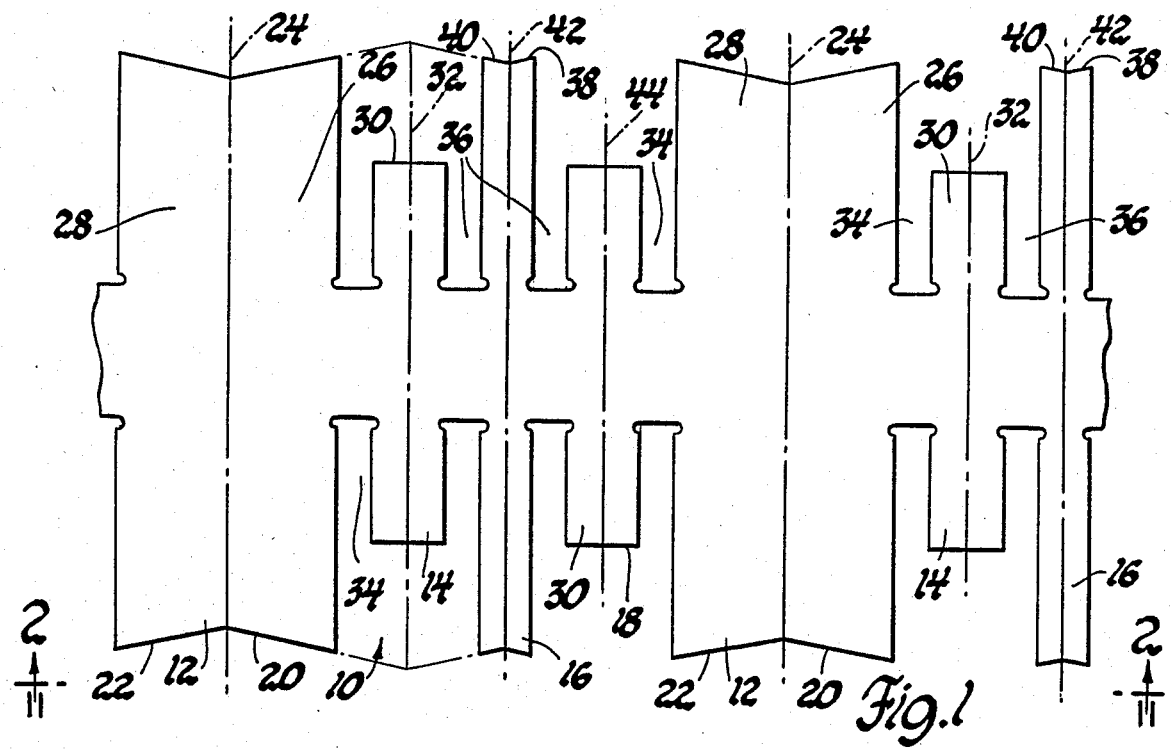
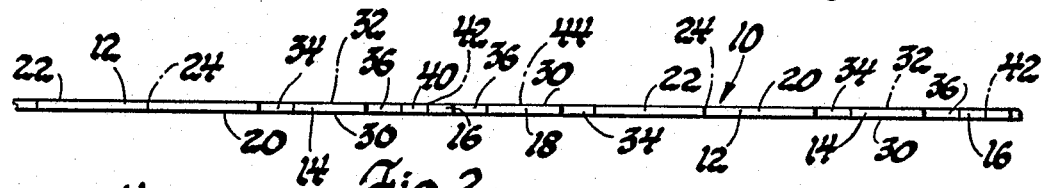
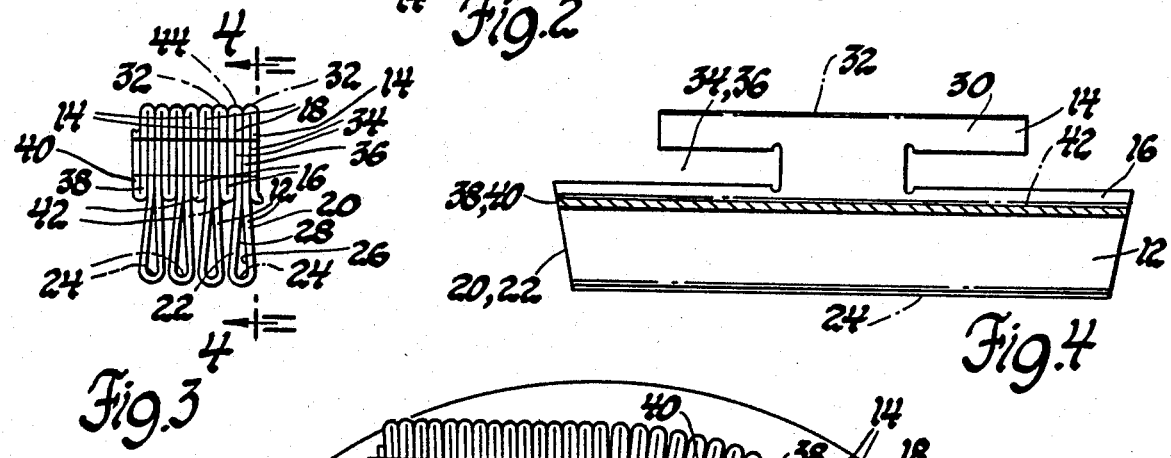
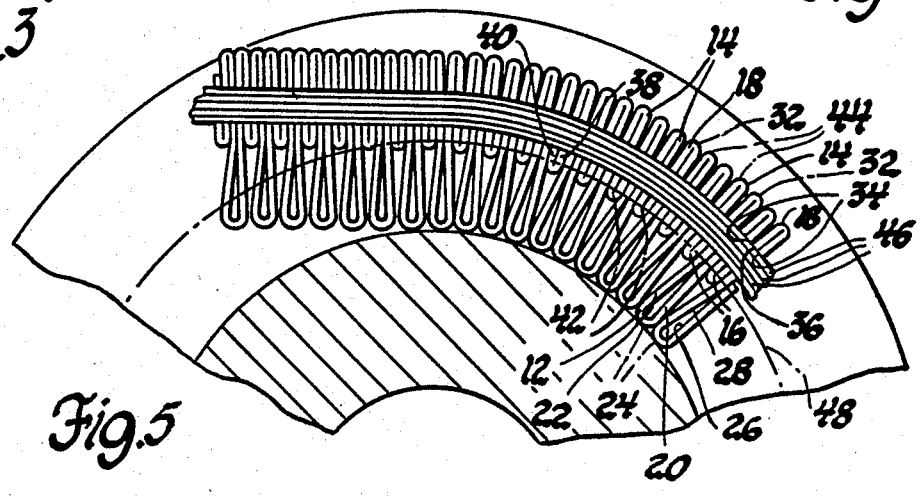

V-BELT STRUCTURE

This application is a continuation-in-part of U.S. Ser. No. 614,749, filed May 29, 1984 now abandoned.

This invention relates to V-belts and more particularly the push-type metal V-belts.

Prior art V-belts of the folded variety use either a single constant thickness folded strip alone or a constant thickness folded strip with individual separator blocks disposed between the outer folds of the strip. The constant thickness folded strip has a large "scrub" distance between the retaining bands and the geometric pitch which results in large friction losses when the pulley ratio is other than 1:1. The combination of a folded strip and separator blocks, while providing a more efficient drive belt, requires the handling and assembly of the individual separator blocks thus increasing the cost and manufacturing complexity of the drive belt.

The present invention provides a single fan-folded strip using alternating long and short folded legs with open folds at the inner edge of the long legs and tight folds at the inner edge of the short legs. Each short leg is sized so that the inner fold thereof will be located approximately at the pitch diameter of the pulley with the belt supported thereon. Continuous retaining bands are disposed in transverse slots adjacent the inner fold of the short leg in close proximity to the pitch diameter thus reducing the "scrub" distance of the belt and pulley assembly.

It is an object of this invention to provide an improved V-belt structure for use with a V-grooved pulley wherein the V-belt includes a single metal strip which is formed and fan-folded with alternating long and short legs and wherein laterally formed slots accommodate a plurality of continuous metal bands and also wherein the pitch diameter of the V-belt and pulley combination is disposed at the inner fold of the short leg in close proximity to the continuous metal bands.

It is another object of this invention to provide an improved push-type metal V-belt for use with V-grooved pulleys wherein a single fan-folded metal band has alternately tight-folded and open-folded portions with said tight-folded portions having an inner fold substantially aligned with the geometric pitch of the belt and the open-folded portions having a length greater than the tight-folded portions and wherein a plurality of lateral slots are formed in the open-folded and tight-folded portions to accommodate a plurality of continuous metal band members which maintain the fan-folded metal strip in a continuous loop configuration.

It is a further object of this invention to provide an improved push-type metal V-belt for use with a pair of V-grooved pulleys wherein a single metal strip is formed to provide a fan-folded metal band having alternately long and short legs with the pitch diameter of the V-belt and pulley combination being disposed at the inner fold of the short leg and wherein a plurality of continuous metal band members surround the fan-folded metal band to maintain the fan-folded metal band in a continuous loop with the metal bands being sized to preload the fan-folded metal band so that nonseparation of the fan-folded metal band and the continuous metal bands is ensured.

These and other objects and advantages of the present invention will be more apparent from the following description and drawings in which:

FIG. 1 is a top view of a formed metal strip;
FIG. 2 is a view taken along line 2—2 of FIG. 1;
FIG. 3 is an end view of a portion of the metal strip when folded;
FIG. 4 is a view taken along line 4—4 of FIG. 3; and
FIG. 5 is an end view of the belt when disposed on a drive pulley.

Referring to the drawings, wherein like characters represent the same or corresponding parts throughout the several views, there is seen in FIGS. 1 and 2 a single metal strip, generally designated 10. When viewing from left to right, the strip 10 has a drive portion 12, a band retaining portion 14, a drive portion 16 and a band retaining portion 18. This configuration is then repeated along the metal strip until the desired number of elements is reached. The drive portion 12 has drive edges 20 and 22 on opposite sides of a fold line 24.

As seen in FIG. 3, the folded configuration has an open radius at fold line 24 such that the adjacent lateral faces 26 and 28 of drive portion 12 are separated. The band retaining portion 14 has a central bar 30 which has a fold line 32. A band slot 34 is formed between drive portion 12 and central bar 30 and a band slot 36 is formed between central bar 30 and drive portion 16. As seen in FIG. 4, the band slots 34 and 36 are aligned when the strip is folded along fold line 32.

The drive portion 16 has drive edges 38 and 40 formed on opposite sides of a fold line 42. The drive portion 16, when folded, forms a short leg between adjacent drive portions 12. Each drive portion 16 has a tight inner fold at fold line 42 and a tight outer fold at fold line 32 of band support portion 14 and also at fold line 44 of band support portion 18. The band support portion 18 is identical in configuration to band support portion 14 and therefor has a central bar 30 with lateral band slots 34 and 36 formed on either side thereof.

The strip 10, when folded to the configuration shown in FIGS. 3 and 4, is formed into a continuous loop or belt by the use of a plurality of metal bands 46. A portion of such bands is shown in FIG. 5. The belt shown in FIG. 5 operates with V-grooved pulleys. The geometric pitch of the drive belt is disposed at the fold line 42 which is coincident with the pitch diameter 48 of the pulleys. As is seen in FIG. 5, the metal bands 46 are in close proximity to the tight inner folds of drive portion 16. With this configuration, there will be minimum relative motion between the metal bands 46 and the formed strip when the belt is operating in a pulley drive system with a drive ratio other than 1:1. As is well-known in a 1:1 drive ratio, there is no relative speed differential.

The continuous metal bands 46 are sized such that at assembly, the fan-folded metal band is preloaded with a force of approximately 1500 newtons. This preload will ensure nonseparation of the fan-folded metal band and the continuous metal band members.

It is well-known in push-type belt drives that the belt provides a linear span or continuous column between the pulleys. In a push-type V-belt drive system, there is a high push load span and a low push load span. The low push load span is similar to the slack side of a conventional V-belt pull-type or tension drive system. In push-type V-belt systems using fan-folded metal bands, it is important to maintain the folded metal bands in compression throughout the low push load span of the belt. If this compression loading is not maintained, it would be possible for the ends of the continuous folded strip to separate. If separation should occur, significant wear of either the belt or the pulley would occur. It has been found that a preloading of 1500 newtons at assembly will ensure that the low push load span of the belt will have a minimum loading of 600 newtons.

To provide this preloading requires that the length of fan-folded band material is slightly longer than a band structure which does not have preloading. With a tightly folded structure at the location where the continuous band members engage the folded band members, it has been found an increase in the fan-folded band length of approximately one centimeter will result in 300 newtons of preload.

While the drawings illustrate the fan-folded band member to include the slots 34 and 36, it is possible to manufacture the band without such slots. If the band is manufactured without the slots, the basic structure of the formed metal strip is simplified significantly. To eliminate the slots 34 and 36, the drive edges 20 and 40 are extended to their point of intersection which would be the fold line 32, and the drive edges 22 and 38 are extended to their point of intersection which would be fold line 44. These extensions are shown in phantom lines in FIG. 1. Should this structure be utilized, the continuous band members 46 would then ride on the surfaces formed at fold lines 32 and 44. Without the slots 34 and 36, a single set of continuous band members is utilized. The preloading of the fan-folded strip by the continuous metal bands prevents separation between these elements prior to installation in a pulley system.

The short folded legs permit the folded strip to remain in contact with the pulley with minimal flexing of the outer edges of the metal band and also retain the tapered inner portions of the drive portions 12 in the configuration shown with minimal relative movement.

The band structure described herein provides very low friction losses and therefor establishes a high drive efficiency within the drive belt configuration. Since the band is formed from a single formed metal strip, the handling of individual drive block components is eliminated.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A push-type metal V-belt for use with V-grooved pulleys and cooperating therewith to establish a pitch diameter comprising; a single fan-folded metal band having alternate tight-folded and open-folded portions, said tight-folded portions having an inner fold substantially aligned with the pitch diameter and said open-folded portion having a length greater than said tight-folded portions; lateral slots formed in both sides of said open-folded and tight-folded portions between inner and outer folds of the open-folded portion; converging drive surface means for frictionally engaging the pulleys formed on the edge surfaces of said open-folded and tight-folded portions extending from said lateral slots to the inner fold of said open-folded portion, and continuous metal band means disposed in said lateral slots for maintaining said fan-folded metal band in a continuous loop when the metal V-belt is combined with the V-grooved pulleys.

2. A push-type metal V-belt for use with V-grooved pulleys and cooperating therewith to establish a pitch diameter comprising; a single fan-folded metal band having alternate long and short leg portions, said short leg portions having an inner fold substantially aligned with the pitch diameter; a band engaging surface formed on both said long leg and said short leg portions; converging drive surface means for frictionally engaging the pulleys formed on the edge surfaces of said long leg and short leg portions, and a plurality of continuous metal band means disposed on said fan-folded metal band with the innermost thereof being adjacent said band engaging surfaces for establishing a preload in said fan-folded metal band for maintaining said fan-folded metal band in a continuous loop when the metal V-belt is combined with the V-grooved pulleys and said preload ensuring nonseparation of said fan-folded metal band and said continuous metal band means at said band engaging surface.

3. A push-type metal V-belt for use with V-grooved pulleys and cooperating therewith to establish a pitch diameter comprising; a single fan-folded metal band having alternate tight-folded and open-folded portions, said tight-folded portions having an inner fold substantially aligned with the pitch diameter and said open-folded portion having a length greater than said tight-folded portions; lateral slots formed in both sides of said open-folded and tight-folded portions between inner and outer folds of the open-folded portion; converging drive surface means for frictionally engaging the pulleys formed on the edge surfaces of said open-folded and tight-folded portions extending from said lateral slots to the inner fold of said open-folded portion, and continuous metal band means disposed in said lateral slots and being stressed to preload said fan-folded metal band for maintaining said fan-folded metal band in a continuous loop when the metal V-belt is combined with the V-grooved pulleys and for ensuring nonseparation of said fan-folded metal band and continuous metal band means.

4. A push-type metal V-belt for use with V-grooved pulleys and cooperating therewith to establish a pitch diameter comprising; a single fan-folded metal band having alternate tight-folded and open-folded portions, said tight-folded portions having an inner fold substantially aligned with the pitch diameter and said open-folded portion having a length greater than said tight-folded portions; lateral slots formed in both sides of said open-folded and tight-folded portions between inner and outer folds of the open-folded portion; converging drive surface means for frictionally engaging the pulleys formed on the edge surfaces of said open-folded and tight-folded portions extending from said lateral slots to the inner fold of said open-folded portion, and continuous metal band means disposed in said lateral slots and being stressed to preload said fan-folded metal band for maintaining said fan-folded metal band in a continuous loop when the metal V-belt is combined with the V-grooved pulleys, for ensuring nonseparation of said fan-folded metal band and said continuous metal band and for ensuring said fan-folded metal band provides an ungapped structure throughout the linear portion of the span between the pulleys.

* * * * *